J. W. JONES.
WINDING DEVICE FOR THE SPRING MOTORS OF TALKING MACHINES.
APPLICATION FILED NOV. 30, 1917.

1,312,181.

Patented Aug. 5, 1919.

Inventor:
Joseph W. Jones
by attorneys

UNITED STATES PATENT OFFICE.

JOSEPH W. JONES, OF NEW YORK, N. Y., ASSIGNOR TO JONES MOTROLA, INC., OF NEW YORK, N. Y., A CORPORATION OF NEW YORK.

WINDING DEVICE FOR THE SPRING-MOTORS OF TALKING-MACHINES.

1,312,181.     Specification of Letters Patent.     Patented Aug. 5, 1919.

Application filed November 30, 1917. Serial No. 204,675.

*To all whom it may concern:*

Be it known that I, JOSEPH W. JONES, a citizen of the United States, and resident of the borough of Manhattan, in the city and State of New York, have invented a new and useful Improvement in Winding Devices for the Spring-Motors of Talking-Machines, of which the following is a specification.

My invention includes a spring motor and its winding motor, both located within the talking machine casing, the winding motor attachment having a shaft which forms an extension of the spring motor shaft, which extension shaft may be driven either automatically from the winding motor within the casing or manually by a winding crank outside the casing attached to the extension shaft.

My invention more particularly includes a prime winding motor such, for instance, as an electric motor, having a driving connection with a worm gear loosely mounted on the spring motor extension shaft, said worm gear having a one way driving connection with the extension shaft.

The object of my invention is to provide means for readily applying my automatic winding attachment to the spring motor within the casing of a talking machine of that type in which there is sufficient space between the end of the spring motor spring shaft and the side of the casing; said application being accomplished without disturbing any of the usual operating parts of the talking machine, the winding motor being secured to the casing, as for instance, by means of a bracket secured to the spring motor carrying board.

Figure 1:
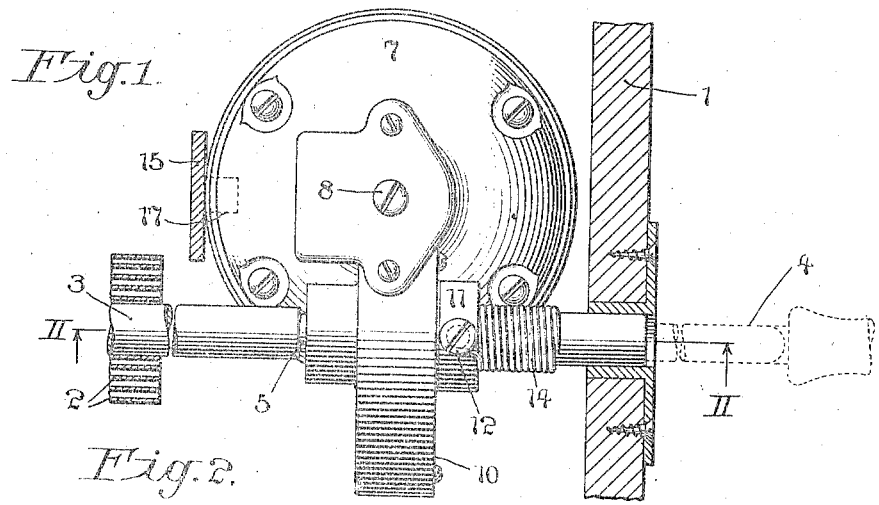
Figure 2:
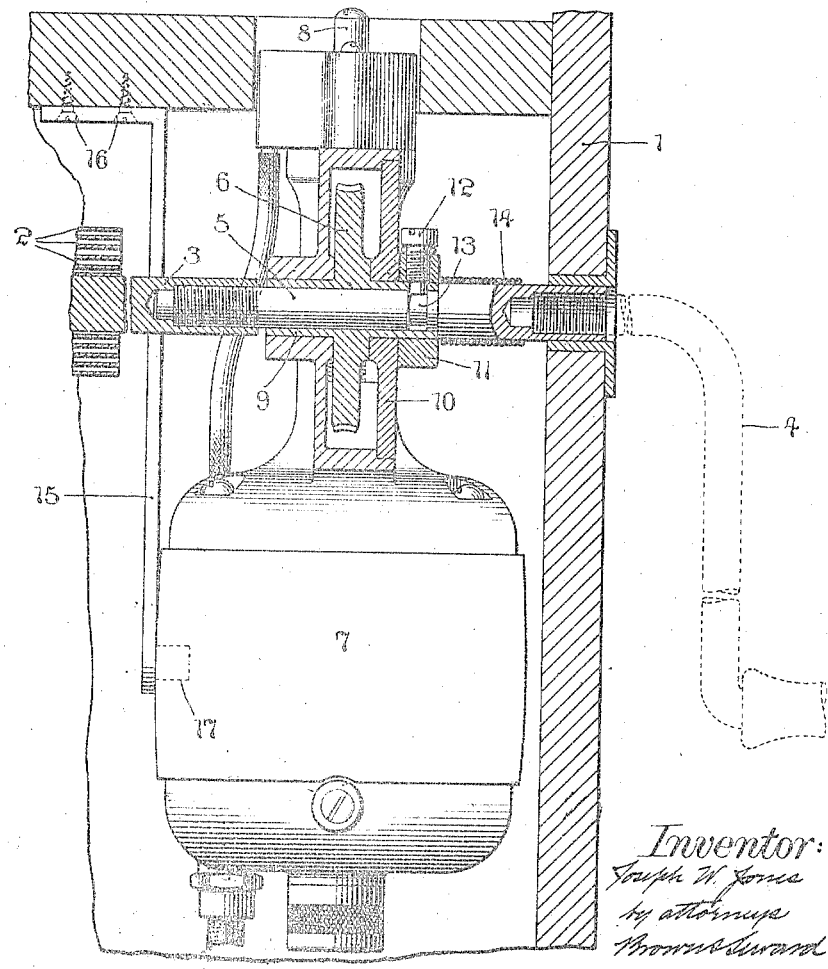

A practical embodiment of my invention is represented in the accompanying drawings in which, Figure 1 is a view of the winding attachment shown partly in top plan and partly in section, and Fig. 2 is a section taken in the plane of the line II—II of Fig. 1.

The automatic spring motor winding device illustrated herein is the one shown, described and claimed in my United States Letters Patent No. 1219325, dated March 13, 1917, and an extended description of this winding device will not be presented herein.

The talking machine casing is denoted by 1. The spring motor spring is denoted by 2 and its shaft by 3. The usual winding crank shown in dotted lines, is denoted by 4. The winding attachment includes the spring motor extension shaft 5, the worm gear 6 loosely mounted thereon, the motor 7, the motor controlling switch 8 and their respective housings.

The hub 9 of the worm gear 6, projects outwardly through its housing 10, and a collar 11 is mounted on said projecting end of the hub 9. A set screw 12 carried by the collar 11, passes through a hole in the projecting end of the hub 9, into a circumferential groove 13 in the extension shaft.

The worm gear has a one-way driving connection with the extension shaft. This connection in the present instance, is shown as a coil spring 14 surrounding the extension shaft and secured at one end to the collar 11 by the set screw 12, the other end of the spring being free. The rotation of the worm gear 6 by the winding motor will turn the coil spring in a direction to cause it to grip the extension shaft 5, while the rotation of the extension shaft 5 in the same direction, when the worm gear 6 is stationary, will open the coil spring and release the driving connection between the worm gear and extension shaft. This will permit the extension shaft to be rotated by the winding crank 4 to wind the spring motor when desired.

The driving connection between the extension shaft 5 and the spring motor shaft 3, is shown as a screw-threaded connection. The driving connection between the winding crank and the outer end of the extension shaft is also shown as a screw-threaded connection.

The means which I employ for securing the winding motor to the inside of the talking machine casing may be a bracket 15 secured to the spring motor board of the casing by screws 16, and it has a pin 17 which enters a hole in the motor housing for holding the motor against turning on the extension shaft due to the torque of the spring motor spring.

It will be seen from the above description that the winding device may be very readily applied to talking machines now in use having sufficient space between the end of the spring motor spring shaft and the side of the casing; said application being accomplished by unscrewing the winding crank from the spring motor shaft and then inserting the extension shaft. This invention may be readily applied, for instance, to certain types of Victor talking machines now in use.

Where it is not feasible to use the winding motor, as for instance where power therefor is unavailable, or if for any cause the motor becomes inoperative, the usual winding crank may be attached to the extension shaft and the spring motor wound manually.

It is evident that various changes may be resorted to in the form, construction and arrangement of the several parts without departing from the spirit and scope of my invention, and hence I do not wish to limit myself to the construction herein set forth, but

What I claim is:

1. In a talking machine, a spring motor and its winding motor, both located within the talking machine casing, a spring motor shaft, a removable extension shaft substituted for the usual winding crank, connecting the spring motor and the winding motor, and means for removably securing the winding motor to the casing.

2. In a talking machine, a spring motor and its winding motor, both located within the talking machine casing, a spring motor shaft, a removable extension shaft substituted for the usual winding crank, connecting the spring motor and the winding motor, and means for removably securing the winding motor to the casing, comprising a depending bracket secured to the spring motor board of the casing, said bracket having means engaging the motor housing for holding the motor against turning on the extension shaft due to the torque of the spring motor spring.

3. In a talking machine, a spring motor and its winding motor, both located within the talking machine casing, a spring motor shaft, a removable extension shaft substituted for the usual winding crank, connecting the spring motor and the winding motor, and means for removably securing the winding motor to the casing, said extension shaft having means for the attachment of the winding crank from outside the casing.

4. In a talking machine, a spring motor and its winding motor, both located within the talking machine casing, a spring motor shaft, a removable extension shaft substituted for the usual winding crank, connecting the spring motor and the winding motor, and means for removably securing the winding motor to the casing, comprising a depending bracket secured to the spring motor board of the casing, said bracket having means engaging the motor housing for holding the motor against turning on the extension shaft due to the torque of the spring motor spring, said extension shaft having means for the attachment of the winding crank from outside the casing.

In testimony, that I claim the foregoing as my invention, I have signed my name this nineteenth day of November, 1917.

JOSEPH W. JONES.